US010703610B2

(12) United States Patent
Fenger (10) Patent No.: US 10,703,610 B2
(45) Date of Patent: Jul. 7, 2020

(54) LIFTING BRACKET

(71) Applicant: LIFTRA IP APS, Aalborg SV (DK)

(72) Inventor: Per Fenger, Terndrup (DK)

(73) Assignee: LIFTRA IP APS, Aalborg SV (DK)

(*) Notice: Subject to any disclaimer, the term of this patent is extended or adjusted under 35 U.S.C. 154(b) by 232 days.

(21) Appl. No.: 15/780,874

(22) PCT Filed: Nov. 23, 2016

(86) PCT No.: PCT/DK2016/050387
§ 371 (c)(1),
(2) Date: Jun. 1, 2018

(87) PCT Pub. No.: WO2017/092761
PCT Pub. Date: Jun. 8, 2017

(65) Prior Publication Data
US 2018/0362304 A1    Dec. 20, 2018

(30) Foreign Application Priority Data

Dec. 3, 2015    (DK) .................................. 201500780

(51) Int. Cl.
| G01B 3/56 | (2006.01) |
| B66C 1/10 | (2006.01) |
| B66C 1/66 | (2006.01) |
| B66C 13/08 | (2006.01) |
| B66C 13/46 | (2006.01) |
| G01B 21/22 | (2006.01) |
| G01B 7/30 | (2006.01) |

(Continued)

(52) U.S. Cl.
CPC .............. B66C 1/108 (2013.01); B66C 1/666 (2013.01); B66C 13/085 (2013.01); B66C 13/46 (2013.01); G01B 7/30 (2013.01); G01B 21/22 (2013.01); F03D 80/50 (2016.05); G01B 7/31 (2013.01); G01B 21/24 (2013.01)

(58) Field of Classification Search
CPC .................................. B66C 1/08; B66C 1/666
USPC .......................................................... 33/333
See application file for complete search history.

(56) References Cited

U.S. PATENT DOCUMENTS

| 3,823,395 A | 7/1974 | Rigney et al. |
| 5,813,124 A | 9/1998 | Freitag |

(Continued)

FOREIGN PATENT DOCUMENTS

WO    2015/165463 A1    11/2015

*Primary Examiner* — George B Bennett
(74) *Attorney, Agent, or Firm* — David S. Safran; Roberts Calderon Safran & Cole, P.C.

(57) ABSTRACT

A lifting tool used during lifting and mounting of a rotor blade on a rotor hub of the wind turbine which facilitates repositioning of the crane's main wire. Thus, a lifting bracket, having an elongated element with a first through-going outlet configured to take up a part of a first link, which is connected with the main wire, and a second through-going outlet configured with a spherical bearing to take up a part of a second link on the load, and wherein the elongated element adjacent to the spherical bearing is provided with a measuring instrument with a signal transmitter for registering the angle between the lifting wire and the vertical direction, wherein the signal transmitter is configured to transmit a signal containing measurements for visualization on an external unit with a screen placed at the crane operator and/or near the crane supervisor.

5 Claims, 6 Drawing Sheets (51) Int. Cl.
*F03D 80/50* (2016.01)
*G01B 7/31* (2006.01)
*G01B 21/24* (2006.01)

(56) References Cited

U.S. PATENT DOCUMENTS

| | | | | |
|---|---|---|---|---|
| 5,841,353 | A * | 11/1998 | Chisholm | G01C 9/00 340/689 |
| 6,370,789 | B1 * | 4/2002 | Madlener | B23Q 17/20 33/366.15 |
| 6,708,478 | B1 * | 3/2004 | Mesmer | A01F 15/0858 100/3 |
| 2009/0055039 | A1 * | 2/2009 | Pollock | B66C 1/08 701/34.4 |
| 2011/0031371 | A1 | 2/2011 | Rube | |
| 2017/0050824 | A1 * | 2/2017 | Fenger | B66C 13/08 |
| 2017/0306930 | A1 * | 10/2017 | Fenger | F03D 80/50 |
| 2019/0309732 | A1 * | 10/2019 | Fenger | F03D 13/10 |

* cited by examiner

LIFTING BRACKET

BACKGROUND OF THE INVENTION

Field of the Invention

The present invention relates to a lifting bracket for attachment between a main wire on a crane, the main wire suspending a load, wherein the length of main wire is defined as the Y-axis, and a plane perpendicular to the Y-axis is defined as the X-axis and the Z-axis, respectively, wherein the lifting bracket comprises an elongated element with a first through-going outlet configured to take up a part of a first link, which is connected to the main wire, and another through-going outlet configured to take up a part of another link on the load.

Description of Related Art

Such items are well known and are often used where there is a need for a distance between the cranes main wire and the load, and for easier attachment and detachment of the load from the main wire on a crane.

In many cases, a special lifting tool is used, in which the item, which is to be lifted to and from a mounting position, is placed. An example hereof can be a rotor blade of a wind turbine, which is placed and fixated in a lifting tool, in order to prevent damaging the surface of the rotor blade during handling thereof from the ground level to its mounting position on the wind turbine rotor hub. When the rotor blade is mounted in the correct position, the rotor blade is released from the lifting tool, and the tool is hereafter removed from the rotor blade. However, the release procedure can be difficult and cause damage to the surface of the rotor blade, if the procedure is not carried out carefully and cautiously. In that context, it is noted that the center of gravity of the lifting tool changes in the instant that the rotor blade is released, due to the weight of the lifting tool, and in order to counteract an angular rotation of the lifting tool, it is necessary to move the lifting tool's lifting point to counteract uncontrollable displacements of the lifting tool with respect to the mounted rotor blade on the wind turbine rotor hub, which can lead to an inexpedient mechanical impact on the rotor blade which, in certain cases, can cause damage to the surface of the rotor blade. In order to control the movement of the lifting tool, it is thus very important that the operator of the crane can ensure that the main wire of the crane, on which the lifting tool is placed, is in a vertical position, and as such does not form an angle with respect to the vertical direction. So far, this information has only been attainable by a visual inspection of the main wire of the crane, and in case of an angular deviation with respect to the vertical direction, the crane operator has performed certain compensating moves with the boom of crane or slews the crane in order to bring the main wire into a vertical position. This is time consuming work and is not always possible to perform correctly, as the distance between the crane operator and the wire often is large (often about 100 m), and moreover, the view of the crane wire can be blocked by the rotor blade. Thus, the operator or a co-worker has to be able to move partially around the wind turbine, as it is not sufficient to see the lifting wire from just one angle, so that a certain margin of error must be expected, which can result in unfortunate mechanical impacts on the surface of the rotor blade.

The crane hook is moved until the crane wire visually appears vertical or the crane operator is given information about an approximate displacement of the lifting point (for example, "move the hook approximately 0.5 m in the length direction of the rotor blade"). With both procedures, there are a number of sources of error. With respect to giving the crane operator information about a given displacement of the crane hook of, for example, 0.6 m in a given direction, the operation is difficult to perform, as the movement is often a combination of having to slew the crane and move the load along the boom. Therefore, the crane operator can have an even more difficult task of performing the displacement of the crane hook, with respect to both length and direction.

The above mentioned scenario also arises when a rotor blade is to be removed from the wind turbine, for example, in connection to performing maintenance on a wind turbine. If, for example, the position of the center of gravity is different for an unloaded and loaded lifting tool, respectively, the lifting point of the lifting tool must be displaced after the lifting tool is fastened to the rotor blade and before the lifting tool, with the rotor blade, is pulled off of the rotor hub. Again it is necessary to verify that the crane wire is vertical, prior to pulling the rotor blade out of the rotor hub.

SUMMARY OF THE INVENTION

As such, it is an objective of the invention to provide an apparatus, which leads to that an operator and/or a crane supervisor for an actual crane, at any time, can read/measure the angle between the lifting wire and the vertical direction.

This objective is achieved by a lifting bracket for attachment between the main wire on a crane and a load suspended on the main wire, wherein the length axis of the main wire is defined as the Y-axis, and a plane perpendicular to the Y-axis is defined by the X-axis and the Z-axis, respectively, wherein the lifting bracket comprises an elongated element with a first through-going outlet configured to take up part of a first link, which is connected to the main wire, and a second trough-going outlet configured to take up a part of a second link of the load, which is characterized in that the second through-going outlet comprises a spherical bearing, which is configured to take up the second link and wherein the elongated element adjacent to the spherical bearing comprises a measuring instrument with a signal transmitter for registering the angle between the wire and the vertical direct, wherein the signal transmitter is configure to send a signal containing measurements for visualization on an external unit placed at the crane operator and/or to a crane supervisor, who informs the crane operator about which operations to perform with the crane.

It is hereby achieved that the crane operator/crane supervisor quickly and easily can get an overview of whether or not the crane's main wire forms an angle with the vertical direction, without having to move outside the cab of the crane.

Without giving up other solutions and embodiments, the measuring instrument with a signal transmitter is comprised of an inclinometer, which measures angular rotations with respect to horizontal about the X-axis, and via the signal transmitter transmitting relevant signal hereof to the external unit.

In a further embodiment of the lifting bracket according to the invention, the measuring instrument with a signal transmitter is comprised by an inclinometer, which measures angular rotations with respect to horizontal about the Z-axis, and via the signal transmitter transmitting relevant signal hereof to the external unit, alternatively by transmission of two relevant independent signals regarding angular rotation with respect to horizontal about the X-axis and the Z-axis, respectively, to the external unit.

The invention is explained further in the following with reference to the drawings.

DETAILED DESCRIPTION OF THE INVENTION

Figure 1:
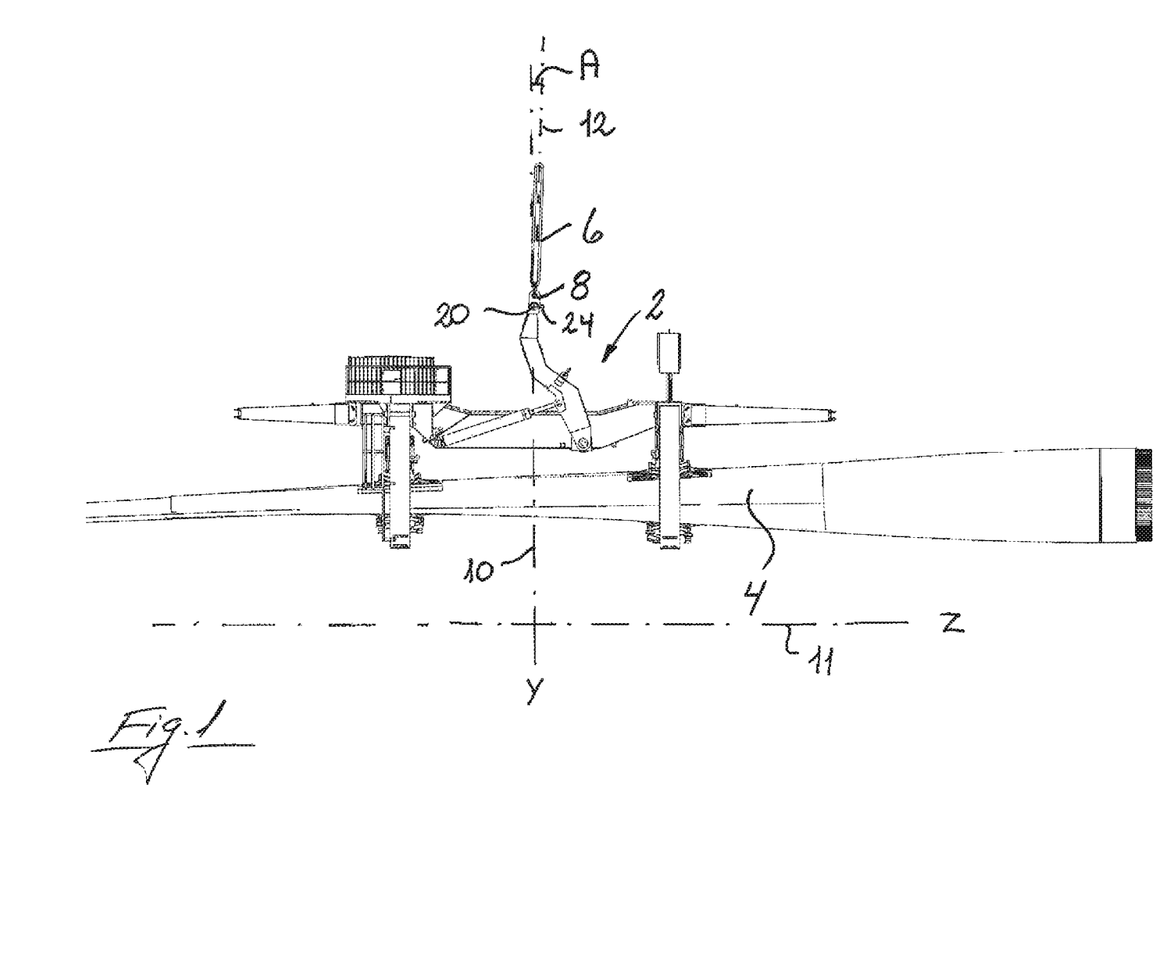
FIG. 1 is a side view of a lifting tool for use in positioning of a rotor blade of a wind turbine, suspended in a crane's main wire via a lifting bracket according to the invention.

FIG. 1 shows a side view of a lifting tool 2 for use in positioning of a rotor blade 4 for a wind turbine, suspended on a main wire 6 of a crane via a lifting bracket 8 according to the invention. The dashed line 10 illustrates the vertical direction, the Y-axis, and the dashed line 12 illustrates the orientation of the crane's main wire 6, and as such it is seen that the main wire forms an angle A with respect to the vertical direction. In FIG. 1, the Z-axis is further illustrated by the dashed line 11.

Figure 2:
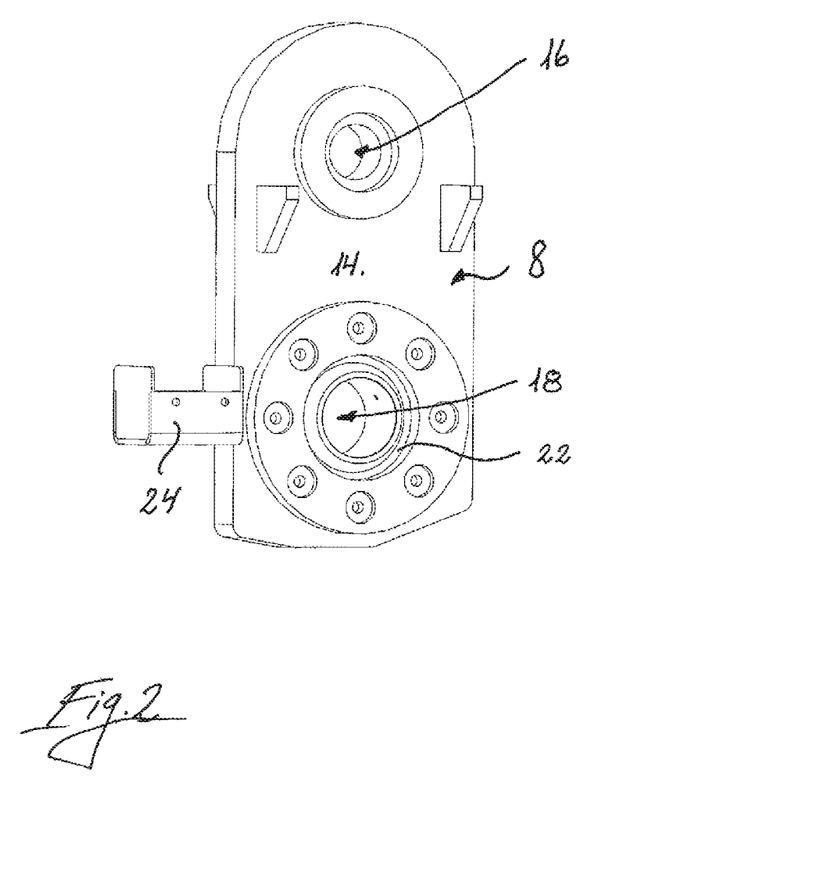
FIG. 2 is a perspective view of the lifting bracket according to the invention.
Figure 3:
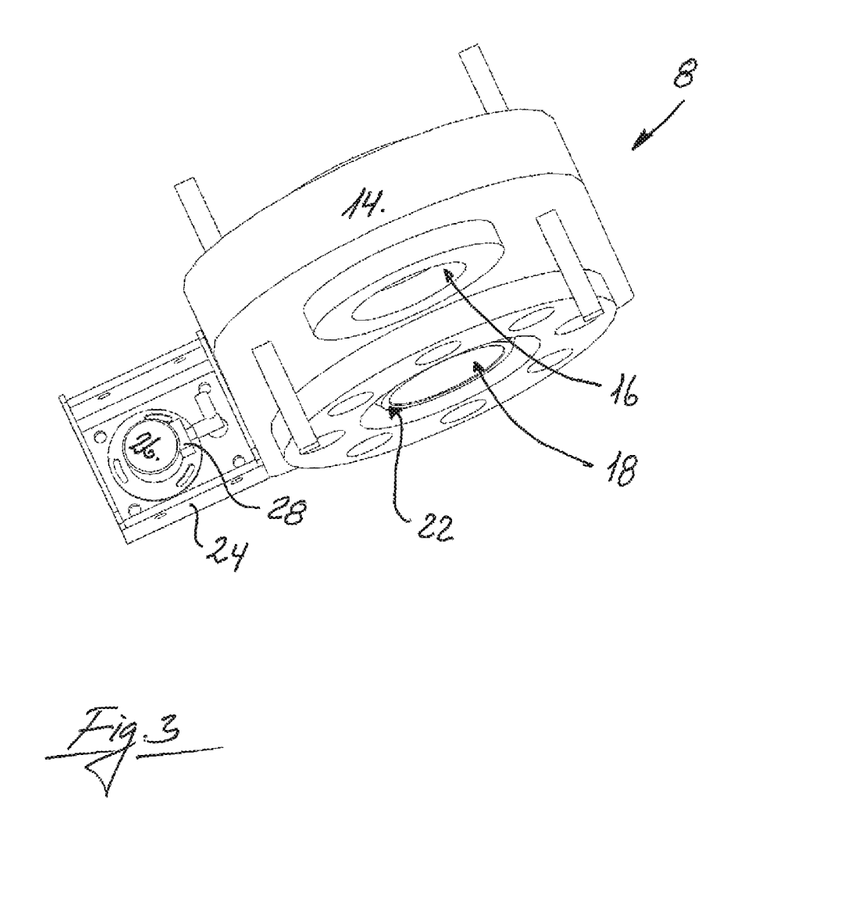
FIG. 3 is a perspective view of the lifting bracket according to the invention seen at an angle from above.
Figure 4:
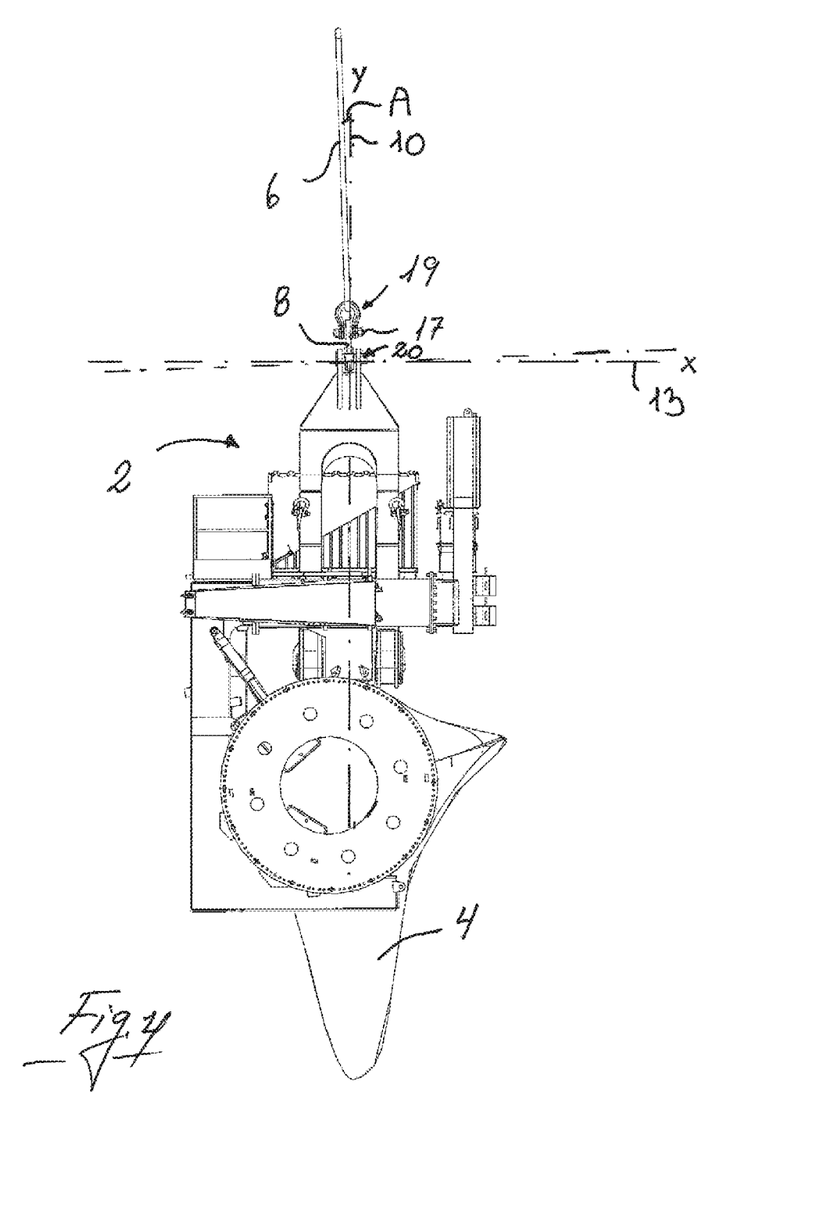
FIG. 4 is end view of a lifting tool for use in positioning of a rotor blade for a wind turbine, suspended on a crane's main wire, via a lifting bracket according to the invention, wherein there is an angular deviation between the main wire and the vertical direction.
Figure 5:
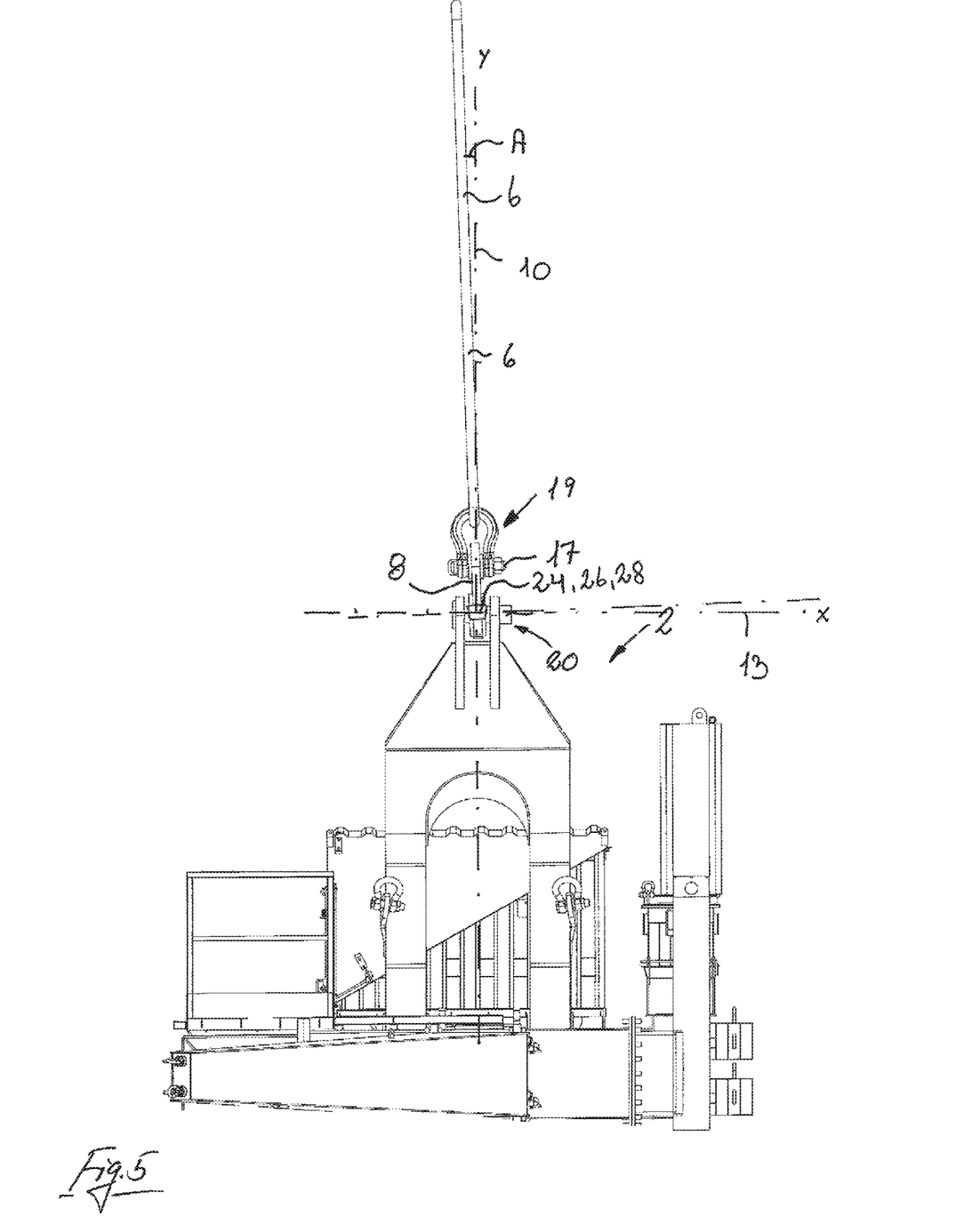
FIG. 5 shows a detailed view of the embodiment according to FIG. 4.

FIGS. 2 & 3 are perspective views of the lifting bracket 8 according to the invention, seen from different angles. The lifting bracket 8 comprise an elongated element 14 with a first through-going outlet 16 configured to take up of a part 17 of a first link 19 (see FIGS. 4 & 5), which is connected to the main wire 6, and a second through-going outlet 18 configured to take up a part of a second link 20 on the load 2, suspended in the main wire 6. In FIGS. 4 & 5, which are end views of a lifting tool 2 for use during positioning of a rotor blade 4 for a wind turbine, suspended in a main wire 6 on a crane, via a lifting bracket 8 according to the invention, wherein there is an angular deviation A between the main wire 6 and the vertical direction 10.

The other through-going outlet 18 comprises a spherical bearing 22, which is configured to take up a part of the second link 20, and wherein the elongated element 14 adjacent to the spherical bearing 22 comprises a housing 24, which for illustrative purposes, is shown partially open in FIG. 2 and namely in FIG. 3, in which in the housing is arranged a measuring instrument 26 with a signal transmitter 28, wherein the measuring instrument 26 registers the angle A between the crane's main wire 6 and the vertical direction 10, wherein the signal transmitter 28 is configured to transmit a signal containing measurement results to a PLC, wherefrom the signal is transmitted on, for visualization purposes, to and external unit 30, (see FIG. 6), located by the crane operator and/or the crane supervisor.

The measuring instrument 26 with a signal transmitter 28 is comprised, in the shown embodiment, by an inclinometer, which measures angular rotation with respect to horizontal about the X-axis 13 and the Z-axis 11, and via the signal transmitter 28 transmits relevant signals hereof to the external unit 30.

Figure 6:
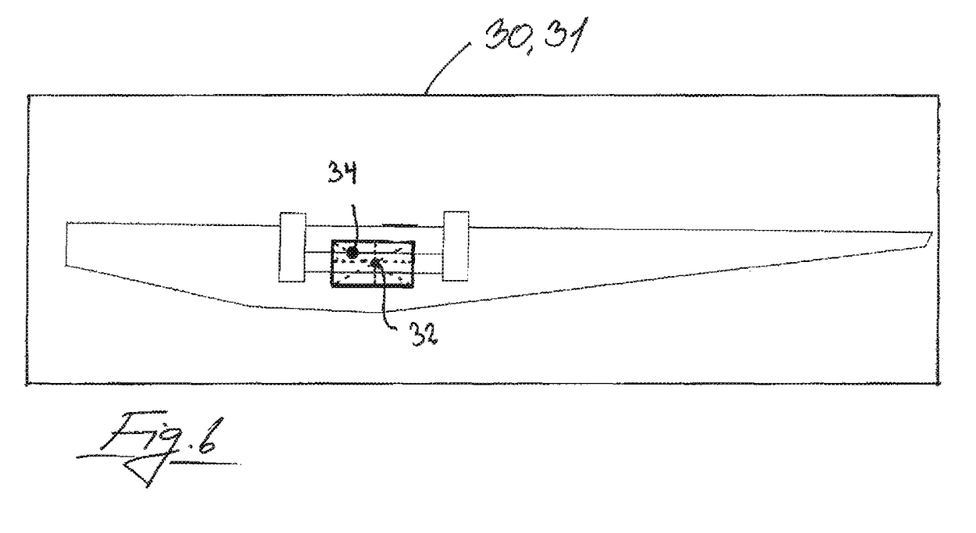
FIG. 6 shows how the angular position of the crane's main wire, with respect to the vertical direction, appears on a display near the crane operator and/or the crane supervisor.

FIG. 6 shows the external unit 30, which on a screen 31 indicates the orientation of the crane's main wire 6, with respect to the vertical direction (Y-axis), detected by means of the measuring instrument 26 with a signal transmitter 28, on the lifting bracket 8 according to the invention. The screen can advantageously be placed in the cab of the crane (not shown) and/or near the crane supervisor, such that the crane's operator and/or the crane super visor, as needed, can orientate themselves about the position of the main wire with respect to the vertical direction.

The dot 32 in the middle of the screen 31 represents vertical 10, and the dot 34 indicates the actual orientation/angle of the main wire 6 with respect to vertical 10.

It will be possible to connect the external unit 30 to an overlaying control system/control unit, where to data regarding the main wire's orientation with respect to the vertical direction 10, for example, in connection to mounting of a rotor blade on a wind turbine, is added, and wherein control of the lifting bracket's gripping arms lets itself activate, when the main wire's orientation is correct with respect to the center of mass of the unloaded lifting tool.

It is noted that the inventor recognizes that there are other suitable measuring instruments for detection of the angle between the main wire 6 and the vertical direction 10, other than the mentioned inclinometer, but use of another type of measuring instrument does not change the inventive concept, which comprises in providing a quick overview of the orientation of a crane's main wire 6 with respect to the vertical direction, when using a lifting bracket according to the invention.

What is claimed is:

1. A lifting bracket for attachment between a main wire of a crane and a load suspended on the main wire, wherein a lengthwise axis of the main wire is defined as a Y-axis, and a plane perpendicular to the Y-axis contains the X- and Z-axes, the lifting bracket comprising:

an elongated element with a first through-going outlet configured to take up a part of a first link which is connected to the main wire, and a second through-going outlet configured to take up a part of a second link on the load, the second through-going outlet comprising a spherical bearing which is configured to take up the second link, wherein the elongated element, adjacent to the spherical bearing, comprises a measuring instrument with a signal transmitter for registering the angle between the main wire and the vertical direction, wherein the signal transmitter is configured to transmit a signal with measurement results for visualization on an external unit with a screen located by at least one of the operator or supervisor of the crane.

2. The lifting bracket according to claim 1, wherein the measuring instrument with the signal transmitter comprise an inclinometer which measures angular rotation with respect to horizontal about the X-axis, and which through the signal transmitter transmits relevant signals thereof to the external unit.

3. The lifting bracket according to claim 2, wherein the inclinometer measures angular rotation with respect to horizontal about the Z-axis and by the signal transmitter transmits angular rotation signals to the external unit.

4. The lifting bracket according to claim 1, wherein the measuring instrument with the signal transmitter comprise an inclinometer which measures angular rotation with respect to horizontal about the Z-axis, and which by the signal transmitter transmits angular rotation signals to the external unit.

5. The lifting bracket according to claim 1, wherein the signal transmitter is a wireless signal transmitter, and wherein the external unit comprises a wireless signal receiver for receiving a signal comprising angular measurement results for visualization.

* * * * *